US008402393B2

United States Patent
Han et al.

(10) Patent No.: US 8,402,393 B2
(45) Date of Patent: Mar. 19, 2013

(54) APPARATUS AND METHOD FOR MANIPULATING VIRTUAL OBJECT

(75) Inventors: Seung Ju Han, Seoul (KR); Wook Chang, Seoul (KR); Hyun Jeong Lee, Seoul (KR); Joon Ah Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 499 days.

(21) Appl. No.: 12/453,353

(22) Filed: May 7, 2009

(65) Prior Publication Data

US 2010/0107127 A1    Apr. 29, 2010

(30) Foreign Application Priority Data

Oct. 23, 2008 (KR) .................. 10-2008-0103993

(51) Int. Cl.
*G06F 3/48* (2006.01)
(52) U.S. Cl. ........ 715/848; 715/773; 715/764; 715/856; 345/419; 345/157; 345/158
(58) Field of Classification Search ............... 715/848
See application file for complete search history.

(56) References Cited

U.S. PATENT DOCUMENTS

| | | | | |
|---|---|---|---|---|
| 5,778,885 A | * | 7/1998 | Doyama et al. | 600/595 |
| 6,084,587 A | * | 7/2000 | Tarr et al. | 345/419 |
| 6,104,379 A | * | 8/2000 | Petrich et al. | 345/157 |
| 6,191,773 B1 | * | 2/2001 | Maruno et al. | 345/158 |
| 6,563,489 B1 | * | 5/2003 | Latypov et al. | 345/164 |
| 6,583,783 B1 | * | 6/2003 | Dietrich et al. | 345/158 |
| 7,932,909 B2 | * | 4/2011 | Niles et al. | 345/474 |
| 2002/0008720 A1 | * | 1/2002 | Hiraki et al. | 345/848 |
| 2005/0116925 A1 | | 6/2005 | Gombert et al. | |
| 2005/0264527 A1 | * | 12/2005 | Lin | 345/156 |
| 2007/0247439 A1 | * | 10/2007 | Daniel et al. | 345/173 |
| 2007/0257903 A1 | * | 11/2007 | Gutierrez et al. | 345/419 |
| 2008/0010616 A1 | * | 1/2008 | Algreatly | 715/856 |
| 2008/0065359 A1 | * | 3/2008 | Rudolph et al. | 703/2 |
| 2008/0088580 A1 | | 4/2008 | Poupyrev | |
| 2009/0181769 A1 | * | 7/2009 | Thomas et al. | 463/32 |
| 2009/0278798 A1 | * | 11/2009 | Kim et al. | 345/158 |
| 2009/0303231 A1 | * | 12/2009 | Robinet et al. | 345/419 |
| 2010/0090945 A1 | * | 4/2010 | Lee et al. | 345/156 |
| 2010/0302144 A1 | * | 12/2010 | Burtner et al. | 345/157 |

FOREIGN PATENT DOCUMENTS

DE    10-2006-045968    4/2008

(Continued)

OTHER PUBLICATIONS

Extended European Search Report dated Jan. 28, 2010, in European Patent Application No. 09173716.3.
Anguelov, Dragomir, et al. "The Correlated Correspondence Algorithm for Unsupervised Registration of Nonrigid Surfaces" Stanford University.

*Primary Examiner* — William Bashore
*Assistant Examiner* — Reza Nabi
(74) *Attorney, Agent, or Firm* — Staas & Halsey LLP

(57) ABSTRACT

Disclosed is a virtual object manipulating apparatus and method. The virtual object manipulating apparatus connects a virtual object in a 3D virtual world with a virtual object manipulating apparatus, senses a grab signal from a user, and determines a grab type of the virtual object based on the sensed grab signal and the connection between the virtual object and the virtual object manipulating apparatus.

11 Claims, 5 Drawing Sheets

FOREIGN PATENT DOCUMENTS

| | | |
|---|---|---|
| JP | 2003-085590 | 3/2003 |
| JP | 2005-084817 | 3/2005 |
| KR | 100209161 | 4/1999 |
| KR | 10-2002-0073890 | 9/2002 |

* cited by examiner (a)

(b)

(c)

APPARATUS AND METHOD FOR MANIPULATING VIRTUAL OBJECT

CROSS-REFERENCE TO RELATED APPLICATIONS

This application claims the priority benefit of Korean Patent Application No. 10-2008-0103993, filed on Oct. 23, 2008, in the Korean Intellectual Property Office, the disclosure of which is incorporated herein by reference.

BACKGROUND

1. Field

Exemplary embodiments relate to an apparatus and method for manipulating a virtual object, and more particularly, to a virtual object manipulating apparatus and method to naturally express a grab type with respect to a virtual object.

2. Description of the Related Art

A virtual world is an interface between a human and a computer, which enables a user to experience as if the user actually interacts with a surrounding circumstance and environment, by simulating a specific circumstance and environment using a computer. This may be called as an artificial reality, a cyberspace, a virtual reality, a virtual environment, a synthetic environment, an artificial environment, and the like.

In the virtual world system, the user and the virtual world space are connected through hardware. The virtual world system enables a participant to sense an event occurring in the virtual world using visual sense, and auditory sense, tactual sense, and the like are used as subsidiaries.

The virtual world system senses a visual point of the user or motion change of the user, and assigns corresponding change to the virtual world. To embody the above, the virtual world system uses a variety of input/output apparatuses.

A 2-dimensional (2D) mouse may be used as the input apparatus of the virtual world system. The 2D mouse is possible to perform a menu-based object grab. The menu-based object grab may only grab a predetermined object, which is a script method that a user may need to learn.

A space navigator that may input 6 Degree of Freedom (DOF) using Pan/Tilting/Zoom (PTZ) may be used as the input apparatus of the virtual world system.

Also, a cyberglove that may transfer motion of a user hands to the virtual world system to perform 3D manipulation may be used as the input apparatus of the virtual world system.

SUMMARY

According to exemplary embodiment, there may be provided a virtual object manipulating apparatus for manipulating a virtual object, the apparatus including a corresponding point searching unit to search for a plurality of corresponding points by comparing a shape of a virtual object selected by a user with a shape of the virtual object manipulating apparatus, a grab type recognizing unit to sense a grab signal from the user and to recognize a grab type of the virtual object manipulating apparatus, and a virtual grab type determining unit to determine a virtual grab type of the selected virtual object based on the plurality of corresponding points and the grab type of the virtual object manipulating apparatus.

According to exemplary embodiments, there may be provided a virtual object manipulating apparatus further including a database storing a shape of at least one reference object, wherein the corresponding point searching unit searches the plurality of corresponding points by further comparing the shape of the selected virtual object with a shape of a reference object corresponding to the shape of the selected virtual object, when the shape of the corresponding reference object is stored in the database According to exemplary embodiments, there may be provided a database further storing at least one reference grab type with respect to the reference object, and a virtual grab type determining unit determining a reference grab type corresponding to the grab type of the virtual object manipulating apparatus as the virtual grab type of the selected virtual object, when the corresponding reference grab type is stored in the database.

According to exemplary embodiments, there may be provided a method for manipulating a virtual object using a 3-dimensional (3D) input apparatus, the method including searching for a plurality of corresponding points by comparing a shape of a virtual object selected by a user with a shape of the 3D input apparatus, recognizing a grab type of the 3D input apparatus by sensing a grab signal from the user, and determining a virtual grab type of the selected virtual object, based on the plurality of corresponding points and the grab type.

BRIEF DESCRIPTION OF THE DRAWINGS

These and/or other aspects of exemplary embodiments will become apparent and more readily appreciated from the following description, taken in conjunction with the accompanying drawings of which.

DETAILED DESCRIPTION

Figure 1:
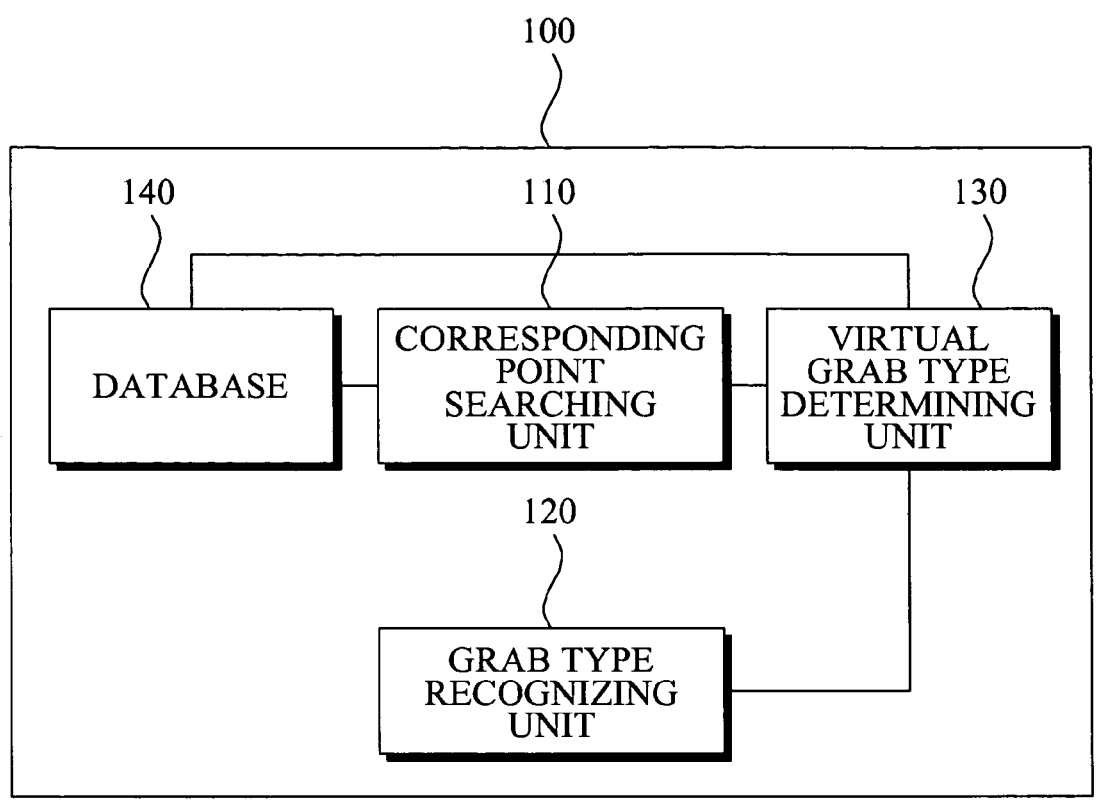
FIG. 1 is a block diagram illustrating a detailed configuration of a virtual object manipulating apparatus according to an exemplary embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a block diagram illustrating a detailed configuration of a virtual object manipulating apparatus according to an exemplary embodiment.

The virtual object manipulating apparatus 100 according to an exemplary embodiment includes a corresponding point searching unit 110, a grab type recognizing unit 120, and a virtual grab type determining unit 130. Here, according to an exemplary embodiment, the virtual object manipulating apparatus 100 may further include a database 140. Hereinafter, function for each element will be described in detail.

The corresponding point searching unit 110 searches for a plurality of corresponding points by comparing a shape of a virtual object selected by a user with a shape of the virtual object manipulating apparatus 100.

That is, when any one virtual object is selected from among virtual objects existing in the virtual world, the corresponding point searching unit 110 connects the selected virtual object with the virtual object manipulating apparatus 100.

To perform the above, the corresponding point searching unit 110 may respectively detect a plurality of vertexes (hereinafter referred to as a first vertex) being on a surface of a shape of the selected virtual object and a plurality of vertexes (hereinafter referred to as a second vertex) being on a surface of the virtual object manipulating apparatus 100, and compares the plurality of first vertexes and the plurality of second vertexes to search for the plurality of corresponding points.

As an example, the corresponding point searching unit 110 may search for the plurality of corresponding points by comparing the first vertexes and the second vertexes having a shortest distance between them.

Also, for an example, the corresponding point searching unit 110 may search for the plurality of corresponding points by connecting the first vertexes and the second vertexes using a correlated correspondence algorithm suggested by Anguelov.

The grab type recognizing unit 120 may sense the grab signal from the user and recognize a grab type of the virtual object manipulating apparatus 100.

That is, when the user grabs the virtual object manipulating apparatus as if the user grabs a virtual object in a virtual world, a grab type recognizing unit 120 senses a grab signal and recognizes the grab type that the user uses to grab the virtual object manipulating apparatus 100.

According to an exemplary embodiment, the grab type recognizing unit 120 may sense the grab signal from the user using at least one from among a touch sensor, a pressure sensor, and a rotation sensor.

The touch sensor is used for sensing touch, which recognizes whether a hand of the user touches the virtual object manipulating apparatus 100, and where the hand of user touches, if the apparatus is touched.

Generally, when the user grabs the object, a shape of the hand of the user may be in different type according to a degree of power used for grabbing the object, namely pressure. The pressure sensor is used for sensing a grab type according to the pressure, which senses pressure signal for grabbing the virtual object manufacturing apparatus 100.

Also, in the case of grabbing the object, the object to be grabbed may be located vertically or parallel to the ground or may be diagonal to the ground. The rotation sensor may sense whether the virtual object is grabbed vertically/parallel or grabbed diagonally. In addition, the virtual object manipulating apparatus may have a variety of shapes.

Hereinafter, referring to FIG. 2 (parts (a) through (c)), a shape of a virtual object manipulating apparatus according to an exemplary embodiment will be described.

Figure 2:
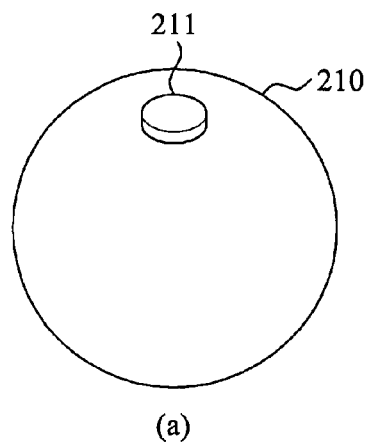
FIG. 2 (parts (a) through (c)) illustrates a shape of a virtual object manipulating apparatus according to an exemplary embodiment.
Figure 2:
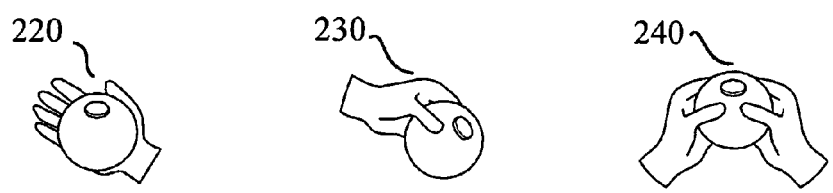
Figure 2:
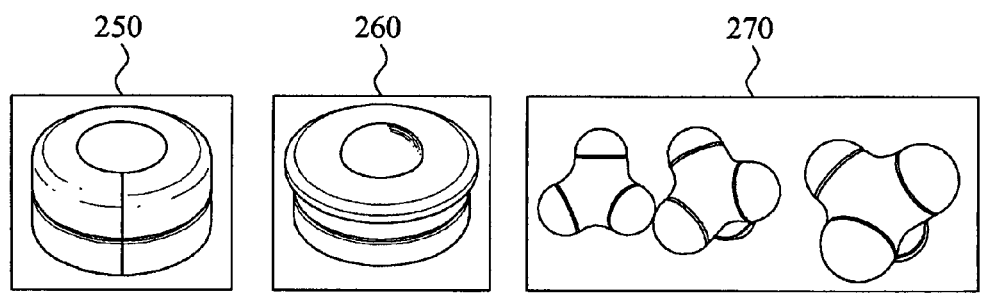

FIG. 2 (parts (a) through (c)) illustrates the shape of the virtual object manipulating apparatus according to an exemplary embodiment.

First, a sphere shape virtual object manipulating apparatus is illustrated in FIG. 2 part (a).

That is, the virtual object manipulating apparatus may include a sphere shape 210 and a button 211 set up on the shape.

The button 211 is used to perform the same function as a mouse or a touch pad which are a conventional 2D input apparatus. That is, the user may perform 2D pointing, manipulation, and the like using the button 211.

Also, a touch sensor, pressure sensor, and a rotation sensor may be set up on the shape 210.

Subsequently, FIG. 2 part (b) illustrates that the sphere shape virtual object manipulating apparatus is grabbed by the user.

As an example, reference numeral 220 illustrates that the user grabs a book, and the like in a virtual world.

As another example, reference numeral 230 illustrates that the user grabs a handle of a bag, and the like.

As another example, reference numeral 240 illustrates that the user grabs a thing, such as a box, with two hands.

As described above, the virtual object manipulating apparatus may recognize a grab type of the user as illustrated in reference numerals 220 to 240 by sensing a signal using the touch sensor, the pressure sensor, the rotation sensor, and the like set up on the shape 210.

FIG. 2 part (c) illustrates virtual object manipulating apparatuses in various shapes.

The virtual object manipulating apparatus may be a sphere shape such as reference numeral 210 or a column shape such as reference numeral 250. Also, the virtual object manipulating apparatus may be in a shape such as reference numeral 260 or reference numeral 270.

Referring again to FIG. 1, the virtual object manipulating apparatus 100 according to an exemplary embodiment will be described.

The virtual grab type determining unit 130 may determine a virtual grab type of the selected virtual object based on the plurality of corresponding points and grab type of the virtual object manipulating apparatus 100.

The virtual grab type determining unit 130 may perform grab of a virtual object according to the grab type of the virtual object manipulating apparatus 100 recognized by the grab type recognizing unit 120.

Although the virtual object manipulation apparatus 100 may be in a regular shape and size, virtual objects may be in a different shape and size for each virtual object. The virtual grab type determining apparatus 130 may adjust the grab type of the virtual object according to a shape and size of the virtual object, to naturally express the grab type.

As an example of adjusting the grab type of the virtual object, the virtual grab type determining unit 130 may embody the grab type of the virtual object using the corresponding points and a grab type of an initial virtual object manipulating apparatus 100, and subsequently, a most natural grab type may be found by moving a virtual hand up and down based on a touch point between the virtual object and the virtual hand.

As described above, according to an exemplary embodiment, the virtual object manipulating apparatus 100 may further include a database 140.

According to an exemplary embodiment, the database 140 may store a shape of at least one reference object.

The reference object indicates an object in a predetermined shape.

According to an exemplary embodiment, the reference object may be one from among a sphere, a hexahedron, a column, and a cone.

The sphere, hexahedron, column, cone, and the like represent a thing in a simple shape. Also, the reference object may be in a variety of shapes besides the sphere, hexahedron, column, and cone.

Also, the database 140 may store the sphere, hexahedron, column, cone varying in size.

In this instance, the corresponding point searching unit 110 according to an exemplary embodiment, may search for a plurality of corresponding points by further comparing a shape of a selected virtual object with a shape of a reference object corresponding to the shape of the selected virtual object, when the shape of the corresponding reference object is stored in the database 140.

That is, when the virtual object is selected by a user, the corresponding point searching unit 110 determines whether the shape of the reference object corresponding to the shape of the selected virtual object exists is stored in the database 140. As an example, a shape of the reference object which is most similar to the shape of the selected virtual object may be retrieved from the database 140.

When the shape of the reference object corresponding to the shape of the selected virtual object is stored in the database 140, the corresponding point searching unit 110 searches for the plurality of corresponding points by comparing the shape of the selected virtual object with the shape of the reference object and the shape of the virtual object manipulating apparatus 100. Accordingly, the selected virtual object, reference object, and virtual object manipulating apparatus are mutually connected.

As described above, the virtual object manipulating apparatus 100 is in a regular shape and size, but the virtual objects are in a different shape and size for each virtual object. Accordingly, the virtual object, reference object, and virtual object manipulating apparatus 100 are all mutually connected using reference objects varying in shape and size, thereby more naturally expressing the grab type of the virtual object varying in shape and size.

Accordingly, the corresponding point searching unit 110 respectively detects a plurality of first vertexes, a plurality of second vertexes, and a plurality of vertexes (hereinafter referred to as a third vertex) on the surface of the shape of the reference object, and respectively compares the plurality of first vertexes, the plurality of second vertexes, and the plurality of third vertexes with each other using an optimization algorithm to search for the plurality of corresponding points.

As an example, the corresponding point searching unit 110 may search for the corresponding points by comparing the first vertexes and the second vertexes having a shortest distance between them, and also, may search for the plurality of vertexes by connecting the first vertexes, the second vertexes, and the third vertexes using a correlated correspondence algorithm.

Also, according to an exemplary embodiment, the database 140 may further store at least one reference grab type with respect to the stored reference object.

In this instance, the virtual grab type determining unit 130 according to an exemplary embodiment may determine a reference grab type corresponding to the grab type of the virtual object manipulating apparatus 100 as the virtual grab type of the selected virtual object, when the corresponding reference grab type is stored in the database 140.

That is, the virtual grab type determining unit 130 may determine whether a shape of the reference grab type corresponding to the grab type of the virtual object manipulating apparatus 100 is stored. As an example, a shape of a reference grab type for a reference object which is in most similar shape to the selected virtual object and a shape of grab type of the virtual object manipulating apparatus 100 are compared, and thus, the shape of the reference grab type similar to the shape of the grab type of the virtual object manipulating apparatus 100 may retrieved from the database 140.

When the shape of the reference grab type corresponding to the grab type of the virtual object manipulating apparatus 100 exists, the virtual grab type determining unit 130 may determined the corresponding reference grab type as the virtual grab type of the selected virtual object. Accordingly, grab type for virtual objects varying in shape and size may be naturally expressed.

Figure 3:
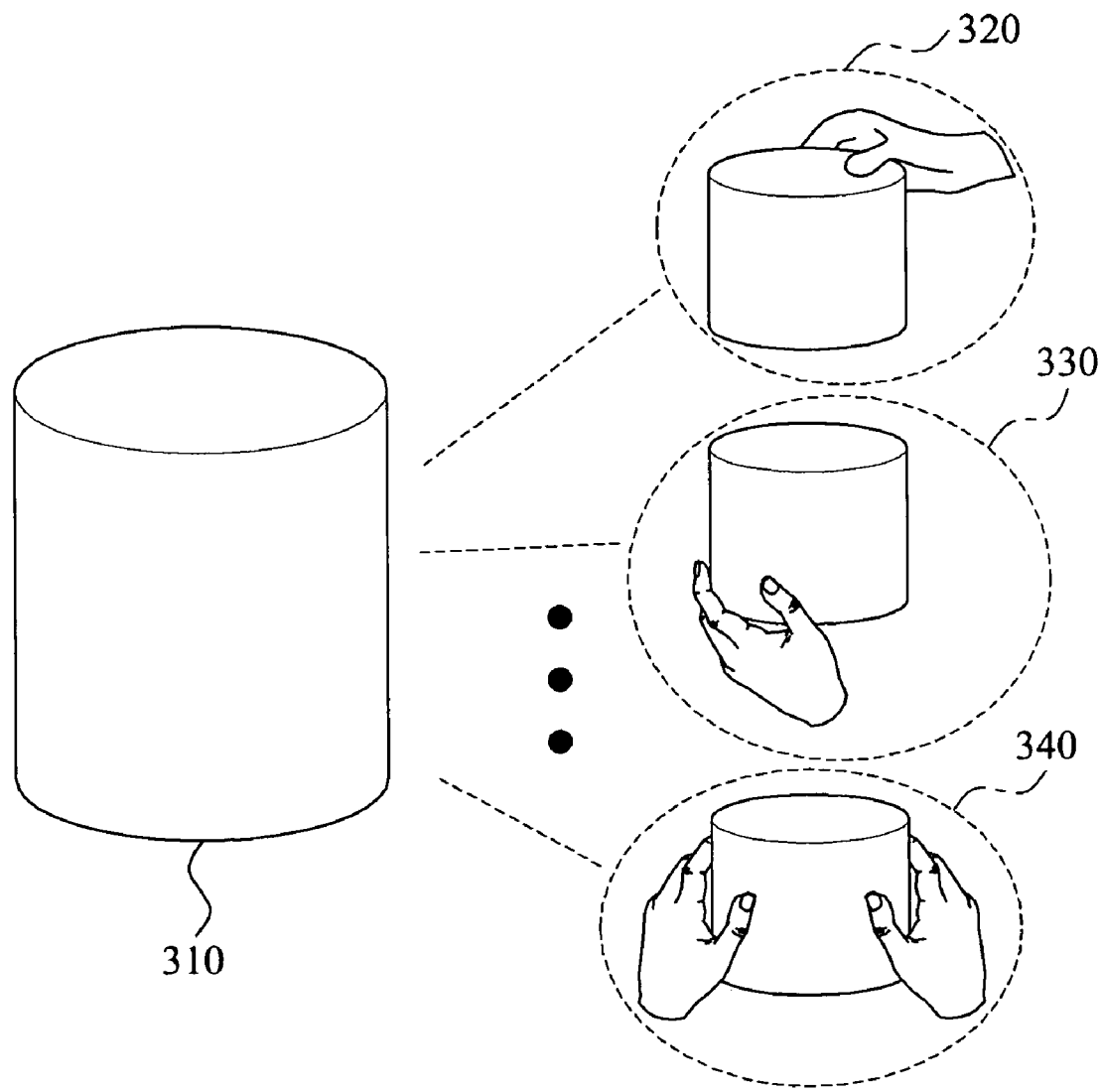
FIG. 3 illustrates a reference object and a reference grab type stored in a database according to an exemplary embodiment.

FIG. 3 illustrates a reference object and a reference grab type stored in a database according to an exemplary embodiment.

Although FIG. 3 illustrates a column-shape reference object 310 is stored in the database, the database may store a shape of at least one reference object, and also may store a variety of shapes including a sphere, a hexahedron, a column, a cone, and the like.

Reference numerals 320 to 340 are examples of a reference grab type for the column-shape reference object 310.

Reference grab types 320 to 340 may be classified according to a shape of at least one reference object and be stored.

Figure 4:
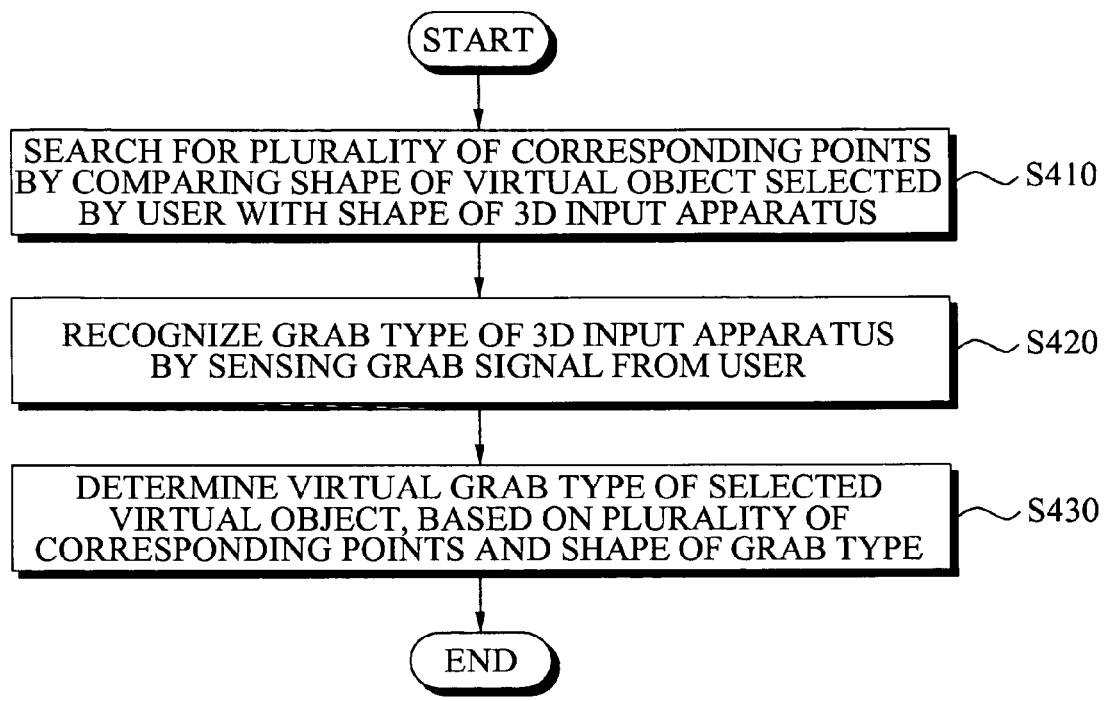
FIG. 4 is a flowchart illustrating a virtual object manipulating method according to an exemplary embodiment.

FIG. 4 is a flowchart illustrating a virtual object manipulating method according to an exemplary embodiment. Hereinafter, referring to FIG. 4, a process performed in each operation will be described in detail.

First, a shape of a virtual object selected by a user and a shape of a 3D input apparatus are compared to search for a plurality of corresponding points in operation S410.

The 3D input apparatus may be corresponding to the virtual object manipulating apparatus.

That is, the selected virtual object and the 3D input apparatus are connected in operation S410.

A plurality of first vertexes and a plurality of second vertexes are respectively detected and the plurality of first vertexes and the plurality of second vertexes are compared through an optimization algorithm to search for the plurality of corresponding points in operation S410. As an example, the first vertexes and the second vertexes having a shortest distance between them are determined to be the corresponding points. Also, a correlation correspondence algorithm may be used for the searching of the corresponding points.

According to an exemplary embodiment, a shape of the 3D input apparatus may be one of a sphere shape and column shape.

In operation S420, a grab signal is sensed from a user, and a grab type of the 3D input apparatus may be recognized.

As an example, the grab signal may be sensed from a part of the 3D input apparatus where a hand of the user touches.

According to an exemplary embodiment, the grab signal may be sensed using at least one from among a touch signal, a pressure signal, and a rotation sense signal caused by the user.

The touch signal is a signal in relation to whether the hand of the user touches the 3D input apparatus, the pressure signal is a signal in relation to a pressure of the user hand at the part where the user hand touches, and the rotation sense signal in relation to whether the virtual object is grabbed vertically/parallel or grabbed diagonally.

According to an exemplary embodiment, the shape of the 3D input apparatus may be one of a sphere shape and column shape. Also, the virtual object manipulating apparatus may in a variety of shapes.

In operation S430, a virtual grab type of the selected virtual object is determined based on the plurality of corresponding points and the grab type of the 3D input apparatus.

That is, operation S430 enables the virtual object to be grabbed according to a shape of the grab type of the 3D input apparatus recognized in operation S420.

According to an exemplary embodiment, the grab type of the virtual object may be adjusted according to a shape and size of the virtual object in operation S430, and thus, the grab type is naturally expressed.

As an example, the grab type of the virtual object is embodied using a grab type of an initial 3D input apparatus, and subsequently, a most natural grab type may be found by moving a virtual hand up and down based on a touch point between the virtual object and the virtual hand.

According to an exemplary embodiment, the virtual object manipulating method may further include a storing process of a shape of at least one reference object in a database.

In this instance, in operation S410, when a shape of the reference object corresponding to a shape of the selected virtual object is stored in the database, the shape of the corresponding reference object is further compared with the shape of the selected virtual object to search for the plurality of corresponding points.

Also, according to an exemplary embodiment, the storing process may further include a storing process of at least one reference grab type for the reference object in the database.

In this instance, in operation S430, when a reference grab type corresponding to the grab type of the 3D input apparatus is stored in the database, the corresponding reference grab type may be determined as the virtual grab type of the selected virtual object.

Hereinafter, referring to FIG. 5, the virtual object manipulating method using the reference object and reference grab type stored in the database will be described in detail.

Figure 5:
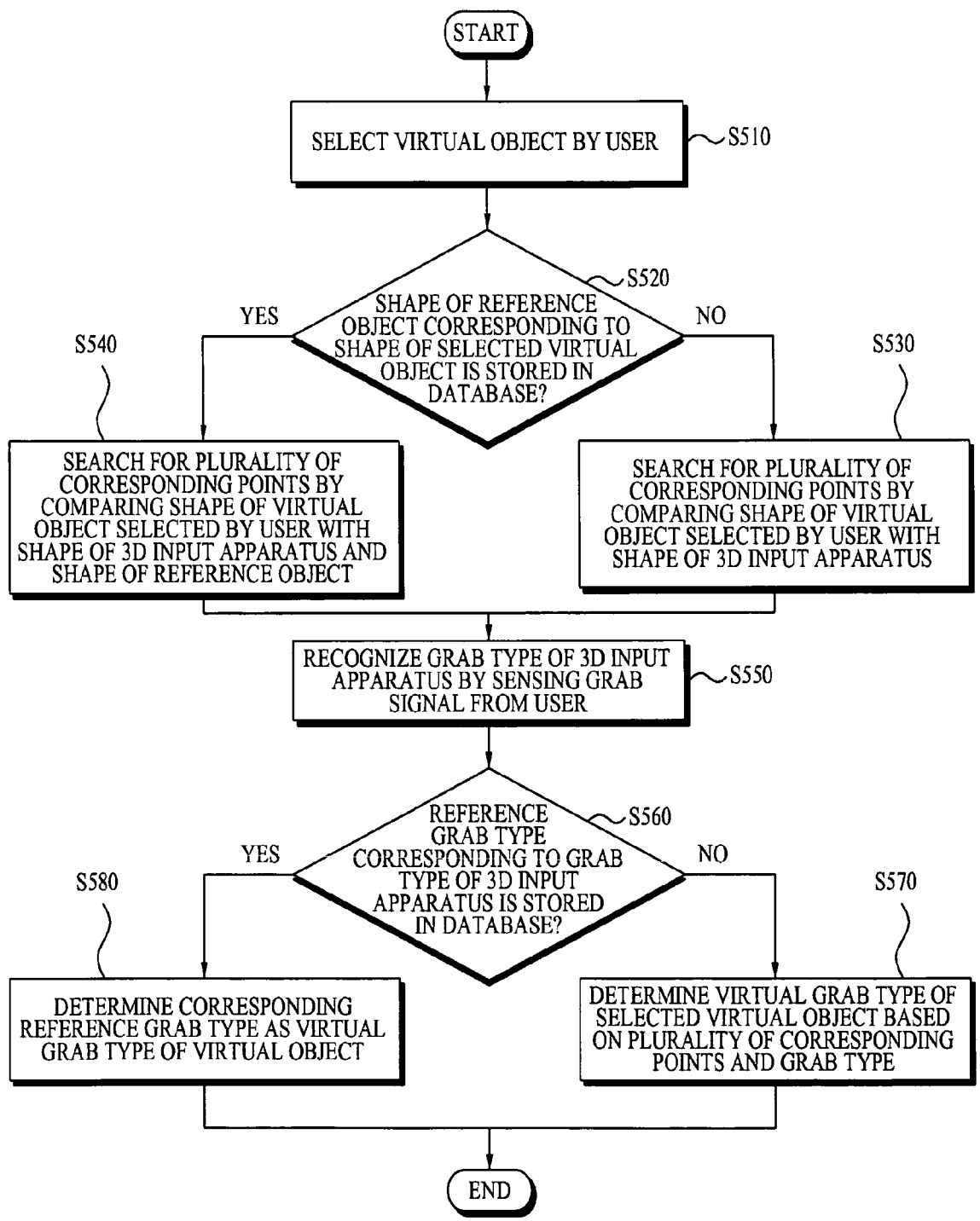
FIG. 5 is a flowchart illustrating a virtual object manipulating method according to another exemplary embodiment.

FIG. 5 is a flowchart illustrating a virtual object manipulating method according to another exemplary embodiment.

First, in operation S510, a virtual object is selected from among virtual objects in a virtual world by a user.

In operation S520, whether a shape of a reference object corresponding to a shape of the selected virtual object is stored in the database is determined.

As an example, a shape of a reference object which is a most similar to the shape of the selected virtual object may be retrieved from the database.

When it is determined that the shape of the reference object corresponding to the shape of the selected virtual object is stored in the database in operation S520, the shape of the virtual object selected by the user is compared with the shape of the 3D input apparatus and the shape of the reference object, and thus, the plurality of corresponding points are retrieved.

The selected virtual object, the reference object, and the virtual object manipulating apparatus are mutually connected.

In this instance, according to an exemplary embodiment, the reference object may be one from among a sphere, a hexahedron, a column, and a cone.

Also, the sphere, the hexahedron, the column, and the cone stored in the database may vary in size.

That is, the virtual object manipulating method may mutually connect all the virtual object, reference object, and 3D input apparatus using reference objects varying in shape and size, thereby naturally expressing a grab type of virtual objects varying in shape and size.

Conversely, when it is determined that the shape of the reference object corresponding to the shape of the selected virtual object is not stored in the database in operation S520, the shape of the virtual object selected by the user is compared with the shape of the 3D input apparatus to search for the plurality of corresponding points.

When the corresponding points are retrieved, a grab signal is sensed from the user in operation S550 and a grab type of the 3D input apparatus is recognized.

In operation S560, whether a reference grab type corresponding to the grab type of the 3D input apparatus exists is determined.

As an example, a reference grab type similar to the grab type of the 3D input apparatus may be retrieved from the database by comparing the grab type of the 3D input apparatus with a reference grab type in relation to a shape of a reference object which is a most similar to the shape of the selected virtual object.

When it is determined that the reference grab type corresponding to the grab type of the 3D input apparatus is stored in the database, the corresponding reference grab type is determined as a virtual grab type of the selected virtual object in operation S580.

Conversely, when it is determined that the reference grab type corresponding to the grab type of the 3D input apparatus is not stored in the database, the grab type of the selected virtual object may be determined based on the plurality of corresponding points and grab type of the 3D input apparatus in operation S570.

A few exemplary embodiments of the virtual object manipulating method have been described, and a configuration of the virtual object manipulating apparatus described in FIG. 1 may be applied to the present exemplary embodiment. Accordingly, detailed description thereof will be omitted.

Also, the virtual object manipulating method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

What is claimed is:

1. A virtual object manipulating apparatus for manipulating a virtual object, the apparatus comprising:
a database storing a shape of at least one reference object;
a corresponding point searching unit to search for a plurality of corresponding points by comparing a shape of a virtual object selected by a user with a shape of the virtual object manipulating apparatus, wherein the corresponding point searching unit detects a plurality of vertexes being on a surface of the shape of the virtual object;
a grab type recognizing unit to sense a grab signal from the user and to recognize a grab type of the virtual object manipulating apparatus; and a virtual grab type determining unit to determine a virtual grab type of the selected virtual object based on the plurality of corresponding points and the grab type of the virtual object manipulating apparatus wherein the determination of the virtual grab type determining unit is performed by:

identifying a reference grab type corresponding to the grab type of the virtual object manipulating apparatus as the virtual grab type of the selected virtual object, the corresponding reference grab type is associated with at least one reference object corresponds to the shape of the virtual object wherein both the corresponding reference grab type and the at least one reference object is stored in the database.

2. The apparatus of claim 1, further comprising: the corresponding point searching unit searches the plurality of corresponding points by further comparing the shape of the selected virtual object with a shape of a reference object corresponding to the shape of the selected virtual object.

3. The apparatus of claim 2, wherein the reference object is one from among a sphere, a hexahedron, a column, and a cone.

4. The apparatus of claim 1, wherein the grab type recognizing unit senses the grab signal using at least one from among a touch sensor, a pressure sensor, and a rotation sensor.

5. The apparatus of claim 1, wherein the shape of the virtual object manipulating apparatus is one of a sphere shape and a column.

6. A method for manipulating a virtual object using a 3-dimensional (3D) input apparatus, the method comprising:
storing a shape of at least one reference object in a database;
searching for a plurality of corresponding points by comparing a shape of a virtual object selected by a user with a shape of the 3D input apparatus, wherein the comparing comprises detecting a plurality of vertexes being on a surface of the shape of the virtual object;
recognizing a grab type of the 3D input apparatus by sensing a grab signal from the user; and
determining a virtual grab type of the selected virtual object, based on the plurality of corresponding points and the grab type of the virtual object manipulating 3D input apparatus wherein the determination of the virtual grab type determining unit is performed by:

identifying a reference grab type corresponding to the grab type of the virtual object manipulating 3D input apparatus as the virtual grab type of the selected virtual object, the corresponding reference grab type is associated with at least one reference object corresponds to the shape of the virtual object wherein both the corresponding reference grab type and the at least one reference object is stored in the database wherein the method is performed using at least one processor.

7. The method of claim 6, further comprising: the searching for the plurality of corresponding points searches for the plurality of corresponding points by further comparing the shape of the selected virtual object with a shape of a reference object corresponding to the shape of the selected virtual object.

8. The method of claim 7, wherein the reference object is one from among a sphere, a hexahedron, column, and a cone.

9. The method of claim 6, wherein the recognizing of the grab type of the 3D input apparatus senses the grab signal using at least one from among a touch sensor, a pressure sensor, and a rotation sensor.

10. The method of claim 6, wherein the shape of the virtual object manipulating apparatus is one of a sphere shape and a column.

11. A computer readable recording medium storing a program implementing the method of claim 6.

* * * * *